United States Patent [19]

Eames, Jr.

[11] Patent Number: 4,485,335
[45] Date of Patent: Nov. 27, 1984

[54] DYNAMIC FOCUSING CIRCUIT FOR A CATHODE RAY TUBE

[75] Inventor: Frederick M. Eames, Jr., Plano, Tex.

[73] Assignee: Harris Data Communications Inc., Dallas, Tex.

[21] Appl. No.: 318,525

[22] Filed: Nov. 5, 1981

Related U.S. Application Data

[63] Continuation of Ser. No. 173,725, Jul. 30, 1980, Pat. No. 4,318,033.

[51] Int. Cl.³ ............................................. H01J 29/58
[52] U.S. Cl. ................................................. 315/382
[58] Field of Search ................ 315/382, 31 R, 31 TV; 307/268

[56] References Cited

U.S. PATENT DOCUMENTS 2,728,022 12/1955 Carpenter, Jr. .................... 315/13 C
3,412,281 11/1968 Richards, Jr. et al. ............. 315/382
3,757,161 9/1973 Kline .................................. 315/382

*Primary Examiner*—Theodore M. Blum
*Attorney, Agent, or Firm*—Yount & Tarolli

[57] ABSTRACT

There is disclosed herein a dynamic focusing circuit for the minor deflection circuit, hereinafter referred to as to the vertical deflection circuit, for a cathode ray tube to compensate for defocusing characteristics thereof. Such a cathode ray tube employs a major deflection circuit, hereinafter referred to as the horizontal deflection circuit, for deflecting the beam along a horizontal axis at a relatively high raster scan frequency, such as on the order of 28 KHz. Additionally, such a cathode ray tube has associated therewith a minor deflection circuit for deflecting the beam along the vertical axis at a second substantially lower scan frequency and which may be on the order of 50 Hz. A focusing circuit normally receives a steady state DC focusing signal for focusing the beam as it is scanned along the respective horizontal and vertical axes. A nonresonant focus correction circuit supplies a correction signal to the focusing circuit for compensating for the defocusing of the beam as it is scanned along the vertical axis. The nonresonant focus correction circuit employs circuitry for providing a sinusoidal signal having a frequency on the order of one-half that of and synchronized to that of the vertical scan frequency together with circuitry that responds to the sinusoidal signal for providing therefrom a correction signal having a generally parabolic shape.

10 Claims, 9 Drawing Figures

DYNAMIC FOCUSING CIRCUIT FOR A CATHODE RAY TUBE

This is a continuation of application Ser. No. 173,725 filed July 30, 1980, now U.S. Pat. No. 4,318,033.

BACKGROUND AND FIELD OF THE INVENTION

This invention relates to the art of cathode ray tubes and, more particularly, to an improved dynamic focusing circuit therefor.

Whereas the invention will be described with reference to a video display terminal employing the improved focus correction circuitry for a cathode ray tube, it will be appreciated that the invention is not limited thereto and may be used in various applications requiring focus correction for a cathode ray tube.

One concern in the art of cathode ray tubes has been the development of suitable dynamic focusing circuits for automatically compensating the distortion resulting from defocusing as the beam is scanned across the face of the tube, which is typically substantially flat. The distortion encountered is maximum at the extremes of the scan, such as at the top margin and bottom margin in a vertical scan. It has been known in the art that a corrective signal to offset the defocusing function should vary in magnitude as the beam is being scanned, providing the greater correction at the extremes or margin areas. It has been generally accepted that the corrective signal take a form which is generally parabolic in shape and applied during each period or sweep of the electron beam.

Efforts have been made in the art to provide such a substantially parabolic corrective signal. One example is the U.S. patent to M. M. Carpenter, Jr. U.S. Pat. No. 2,728,022. In that system corrective voltages are supplied for both the horizontal and vertical sweeps to compensate for the defocusing. As applied to the vertical defocusing compensation, this system synchronizes the correction with the vertical sync signal provided by television receiver circuitry. More specifically, a sine wave generator is employed to develop a sinusoidal signal having a frequency on the order of one-half that of the vertical sync signal. The sine wave signal is then full wave rectified and then inverted to obtain the generally parabolic shaped correction signal. The full wave rectifier employes a tuned circuit including a transformer and is tuned to the frequency of the sync signal. A notable disadvantage in employing a circuit of this nature is that a tuned circuit for low frequencies requires substantial inductance and, hence, weight. Carpenter also discloses two embodiments which do not use tuned circuits. But, inductive circuits including transformer couplings are employed. Circuits employing LC tuned circuits or wave shapers have found some acceptance with respect to a horizontal deflection circuit which operate at a high frequency on the order of 28 KHz. However, the vertical sweep rate is at a substantially lower level, on the order of 50 Hz, and, hence, would require a massive LC circuit.

SUMMARY OF THE INVENTION

It is an object of the present invention to provide a generally parabolic shaped correction signal to compensate for distortions due to defocusing in a cathode ray tube without employing resonant circuits, such as massive LC tune circuits.

It is a still further object of the present invention to provide such a correction signal for the minor deflection circuit of a cathode ray tube.

In accordance with one aspect of the present invention, a dynamic focusing circuit is provided for a cathode ray tube which has means for deflecting the beam along respective first and second axes as well as focusing means for normally receiving a steady state DC focusing signal for focusing the beam as it is scanned along the first and second axes. A nonresonant focus correction circuit supplies a correction signal to the focusing means to compensate for defocusing characteristics of the beam. The nonresonant focus correction circuit includes circuitry for providing a sinusoidal signal together with means which responds thereto to provide the correction signal without employing resonant circuitry.

In accordance with a more limited aspect of the present invention, it is contemplated that both major and minor deflection circuits serve to deflect the beam along first and second axes at respectively first and second frequencies, with the minor deflection frequency being substantially lower than that of the major deflection frequency and on the order of approximately 50 Hz. The correction signal is derived from a sinusoidal signal which has a frequency on the order of one-half that of the minor deflection frequency.

BRIEF DESCRIPTION OF THE DRAWINGS

The foregoing and other objects and advantages of the invention will become more readily apparent from the following description of a preferred embodiment of the invention as taken in conjunction with the appended drawings wherein.

DETAILED DESCRIPTION

Figure 1:
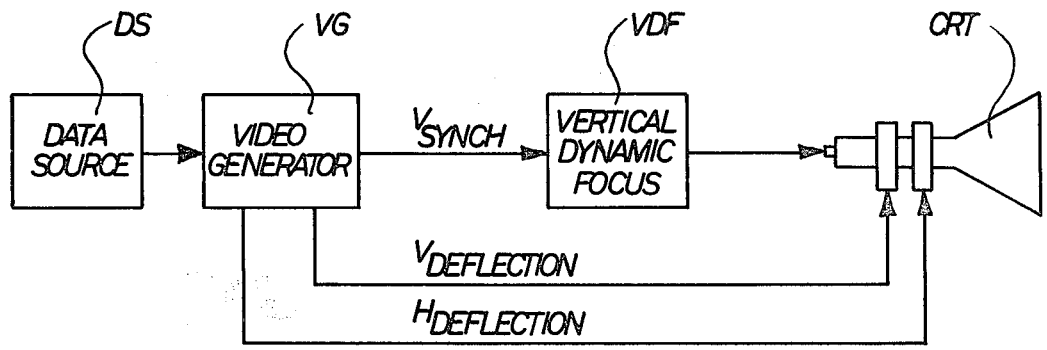
FIG. 1 is a block diagram illustration of a video display terminal to which the present invention may be applied.

Reference is now made to the drawings wherein the showings are for purposes of illustrating the preferred embodiment of the invention only and not for purposes of limiting same. FIG. 1 is a schematic block diagram generally illustrating an application of the invention to a video display terminal or the like. It is to be understood that the invention may be applied in various applications wherein it is desirable to compensate for defocusing of a cathode ray tube as a beam is being scanned. The video display terminal may be generalized as in FIG. 1 wherein a suitable data source DS supplies data and instructions to a video generator VG which, in turn, controls the operation of the cathode ray tube CRT. As is known in the art, the video generator supplies vertical deflection and horizontal deflection signals to associated controls on the cathode ray tube causing the beam to be deflected along the respective vertical and horizontal axes thereof. Both vertical sync signals $V_s$ and horizontal sync signals are typically provided by the video generator. The horizontal sync signals control the horizontal raster scan (along the major axis) with a scan frequency which may typically be on the order of 28 KHz. The vertical sync signal is at a much lower frequency and in the illustrated embodiment is on the order of 50 Hz. More specifically, depending upon the application, it is either 49 Hz or 64 Hz. As is known, the vertical sync signal is proived after a frame has been displayed on the screen and the signal is used to cause a flyback of the beam to its normal starting position, usually at the top lefthand corner of the screen. As this occurs only after a frame, it is easily seen that it is at a much lower frequency than that of the horizontal sync signal.

The cathode ray tube CRT is of a standard construction. The face of the tube is generally flat, although in some instances, it might be only slightly curved. In the embodiment illustrated, it is contemplated that the cathode ray tube is of the type employing electro-static focusing and deflection control as opposed to the magnetic control employed in some cathode ray tube devices. It is contemplated, however, that the invention may be used with either.

In the operation of such a cathode ray tube, the beam is typically raster scanned along the major or horizontal axis, commencing at the upper level of the screeen and then stepped downwardly until a frame of characters has been displayed. Typically in a television application, two fields are required to constitute a frame. First one video field is presented and then the other field is presented with the scan lines being interlaced. Whether the application is that of a television or that of a video display terminal, defocusing takes place particularly at the extremes of the scan. A correction signal supplied to the electrostatic focusing control may take the form of a generally parabolic shape. Contary to the attempts made in the prior art, this is accomplished herein without the use of massive LC tuned circuits. This is particularly advantageous for the minor deflection circuitry which has a relatively low frequency level, on the order of 50 Hz. The vertical dynamic focus circuit will not be explained in detail with reference to FIG. 2 and the waveforms of FIGS. 3A–3G.

Figure 2:
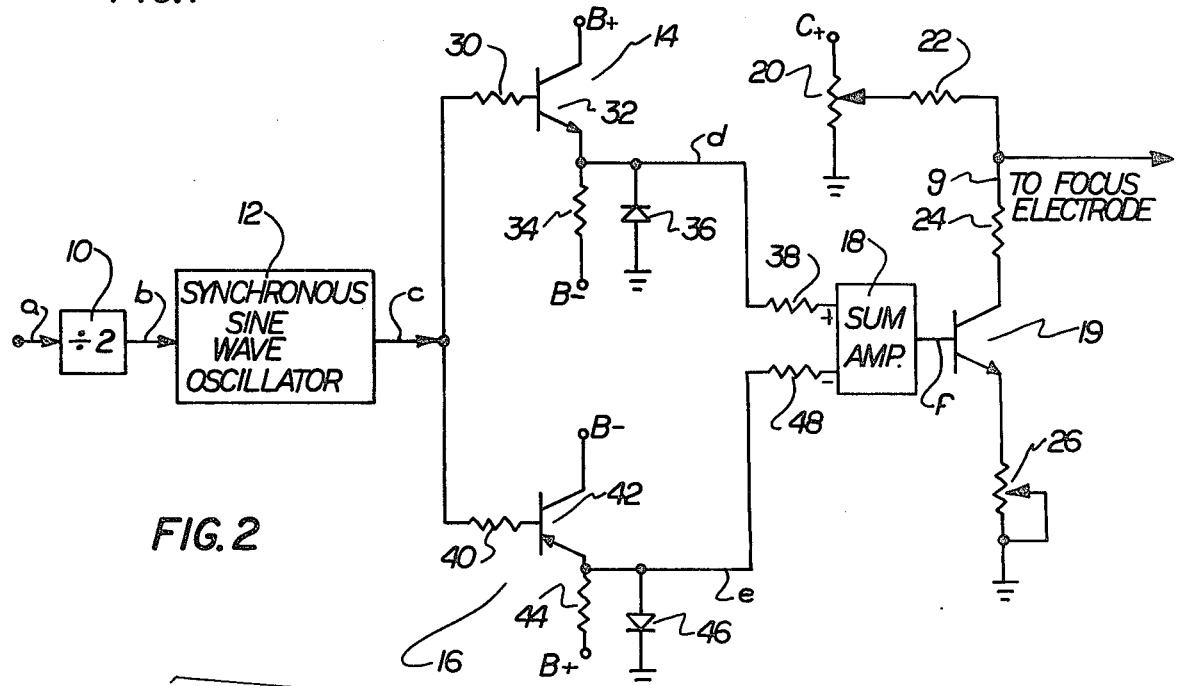
FIG. 2 is a combined schematic block diagram illustration of the improved dynamic focus circuit in accordance with the present invention.
Figure 3:
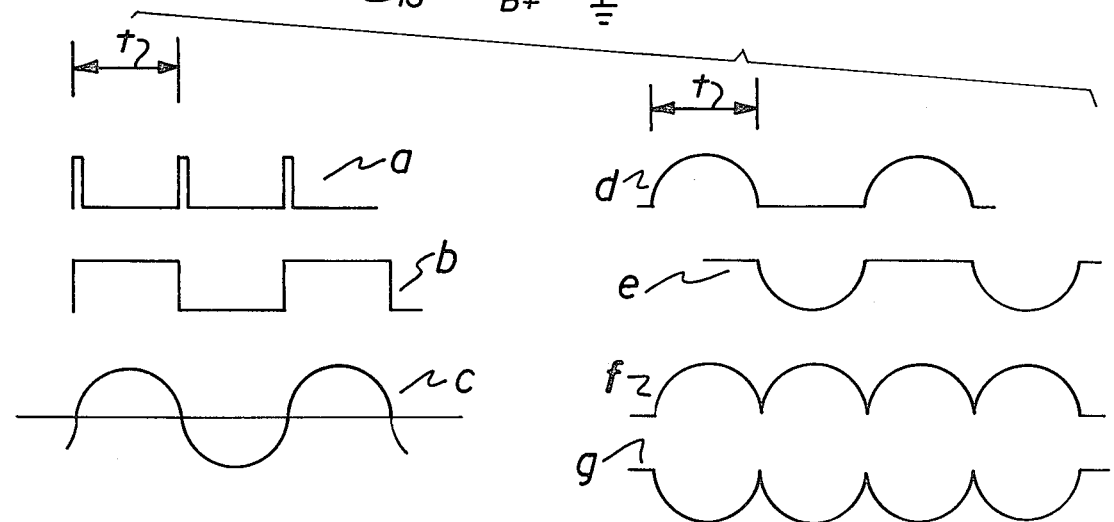
FIGS. 3A–3G are waveforms useful in describing the circuitry of FIG. 2.

Waveform 3A is representative of the vertical sync signals supplied by the video generator VG (FIG. 1). The sync signals have a frequency on the order of 49 Hz and consequently successive pulses are separated by a period t which is on the order of 20 miliseconds. As shown in FIG. 2, the vertical sync pulses are supplied to a divide by two wave shaper circuit 10 which serves to supply an output signal having a waveform as shown in FIG. 3B. This is a square wave and each of the pulses has a width on the order of t. The divide by two wave shaper 10 may typically comprise a toggle flip-flop. The squarewave signal is then supplied to a synchronous sine wave oscillator 12.

Oscillator 12 responds to the square wave input to supply a sinusoidal signal as evidenced by the waveform 3C. This sinusoidal signal has a frequency of one-half that of the vertical sync signal and is supplied to a pair of clipping circuits 14 and 16 which together serve as a form of full wave rectifier. The two clipping cirucits will be described in greater detail hereinafter. Clipper circuit 14 provides a half wave rectified signal having a waveform in accordance with that illustrated in FIG. 3D. Thus the positive excursions of the sinusoidal signal are passed to the positive input (noninverting input) of a summing amplifier 18. Clipper circuit 16, on the other hand, passes the negative excursions of the input signal so that the output thereof appears as indicated by the waveform 3E and is supplied to the negative (or inverting) input of summing amplifier 18.

The summing amplifier may take the form of a typical operational amplifier with appropriate feedback and serves to combine the output signals corresponding with waveforms of FIGS. 3B and 3E to obtain a pulsating output signal which appears as is indicated by the waveform of FIG. 3F. This is a postive full wave rectified version of the sinusoidal input signal supplied to the clipper circuits. Each pulsation has a period corresponding with that of t in FIG. 3A.

The output from the summing amplifier is supplied to the base of an NPN transistor 19 so that as the transistor becomes more conductive with a more positive going excursion, current will flow through its collector-emitter circuit from a C+ voltage supply source through the wiper arm of a potentiometer 20 and resistors 22, 24 and through a variable biasing resistor 26 to ground. This will cause the high voltage from the C+ voltage supply source to be decreased somewhat from a high of approximately 250 volts to a low of approximately 50 volts and exhibit a waveform as evidenced by that illustrated in FIG. 3G. This is essentially a parabolic signal and is supplied to the electrostatic focus electrode in the cathode ray tube CRT. This parabolic correction signal serves to compensate for the inherent defocusing of such a cathode ray tube as the beam is being scanned.

Reference is now made to the clipper circuits 14 and 16 and the manner of their operation. Each of these circuits is comprised of an emitter follower and a clamping diode. Thus, with reference to circuit 14 the positive excursions of the output signal from oscillator 12 are supplied by a resistor 30 to the base of an NPN transistor 32 causing current to flow through its collector to emitter circuit from a B+ voltage supply source to a B− voltage supply source by way of the emitter follower resistor 34. Diode 36 serves to clamp the emitter potential so that the level of signal will not go below ground level and will always be a positive going excursion which is supplied by way of the summing resistor 38 to the noninverting input of summing amplifier 18. The negative going excursions of the sinusoidal signal will have no effect on circuit 14 and, hence, the output signal from the clipping circuit will exhibit a waveform such as that shown in FIG. 3D.

Circuit 16 operates in a manner similar to that just described with respect to circuit 14. Thus, the negative going excursions of the output signal from oscillator 12 are supplied through a resistor 40 to a base of PNP transistor 42 causing current to flow through the emitter collector circuit from the B+ to the B− sources by way of resistor 44. Diode 46 clamps the emitter so that positive going excursions will not exceed ground level and the output signal is supplied through resistor 48 to the inverting input of summing amplifier 18.

The two clipper circuits 14 and 16 serve effectively as a full wave rectifier of the sinusoidal signal obtained from oscillator 12 without the use of inductive material, such as the circuits employed in the prior art. The dynamic focusing circuit provided in accordance with FIG. 2 is of particular advantage for a low frequency signal, such as that for a minor deflection circuit of the nature described herein.

Whereas the invention has been described with respect to a particular embodiment, it is to be appreciated that various modifications may be made thereto without departing from the spirit and scope of the invention as defined by the appended claims.

What is claimed is:

1. A dynamic focusing circuit for a cathode ray tube having means for deflecting the cathode ray beam along first and second mutually perpendicular axes and wherein said beam is deflected along said first axis at a first raster scan frequency and along said second axis at a second raster scan frequency which is substantially lower than said first frequency, and focusing means for normally receiving a steady state DC focusing signal for focusing said beam as it is scanned along said respective axes, noninductive and nonresonant focus correction means for supplying a correction signal to said focusing means while said beam is being deflected along said second axis to compensate for defocusing characteristics of said focusing means in response to said steady state DC signal, said noninductive and nonresonant focus correction means including:

means for providing a periodic signal having a frequency one-half said second scan frequency, means responsive to said periodic signal for providing therefrom a said correction signal having a generally parabolic shape to compensate for said defocusing; and means for directly applying said correction signal to said focusing means.

2. A dynamic focusing circuit as set forth in claim 1 wherein said periodic signal is a sinusoidal signal and said noninductive and nonresonant focus correction means includes means for full wave rectifying said sinusoidal signal.

3. A dynamic focusing circuit as set forth in claim 2 wherein said full wave rectifying means includes first and second clipping circuit means each passing a portion of said sinusoidal signal.

4. A dynamic focusing circuit as set forth in claim 3 wherein each said clipping circuit includes a emitter follower circuit.

5. A dynamic focusing circuit as set forth in claim 4 wherein each said clipping circuit includes a clamping diode coupled to said emitter follower circuit for preventing the emitter signal thereof from passing through ground potential.

6. A dynamic focusing circuit for a cathode ray tube having major deflection means for deflecting the cathode ray beam for raster scanning along a first axis at a first scan frequency and minor deflection circuit means for deflecting said beam along a second axis perpendicular to said first axis and at a substantially lower scan frequency and focusing means for normally receiving a steady state DC focusing signal for focusing said beam as it is scanned along said axes, noninductive and nonresonant focus correction means for supplying a correction signal to said focusing means to compensate for defocusing of said beam as it is scanned along said second axis;

said noninductive and nonresonant focus correction means including:

means for providing a periodic signal having a frequency one-half that of and synchronized to said second scan frequency, means responsive to said periodic signal for providing therefrom a correction signal having a generally parabolic shape to compensate for said defocusing along said second axis; and means for directly applying said correction signal to said focusing means.

7. A dynamic focusing circuit as set forth in claim 6 wherein said second frequency is on the order of 50 Hz.

8. A dynamic focusing circuit as set forth in claim 6 wherein said periodic signal is a sinusoidal signal and said noninductive and nonresonant focus correction means includes means for full wave rectifying said sinusoidal signal to obtain a periodic pulsating signal of generally parabolic shape.

9. A dynamic focusing circuit as set forth in claim 8 wherein said means for full wave rectifying said sinusoidal signal includes a pair of clipping circuits each including an emitter follower circuit.

10. A dynamic focusing circuit as set forth in claim 9 including clamping diode means associated with each of said emitter follower circuits for preventing the emitter signal from traversing from one polarity to another.

* * * * *